Patented May 11, 1954

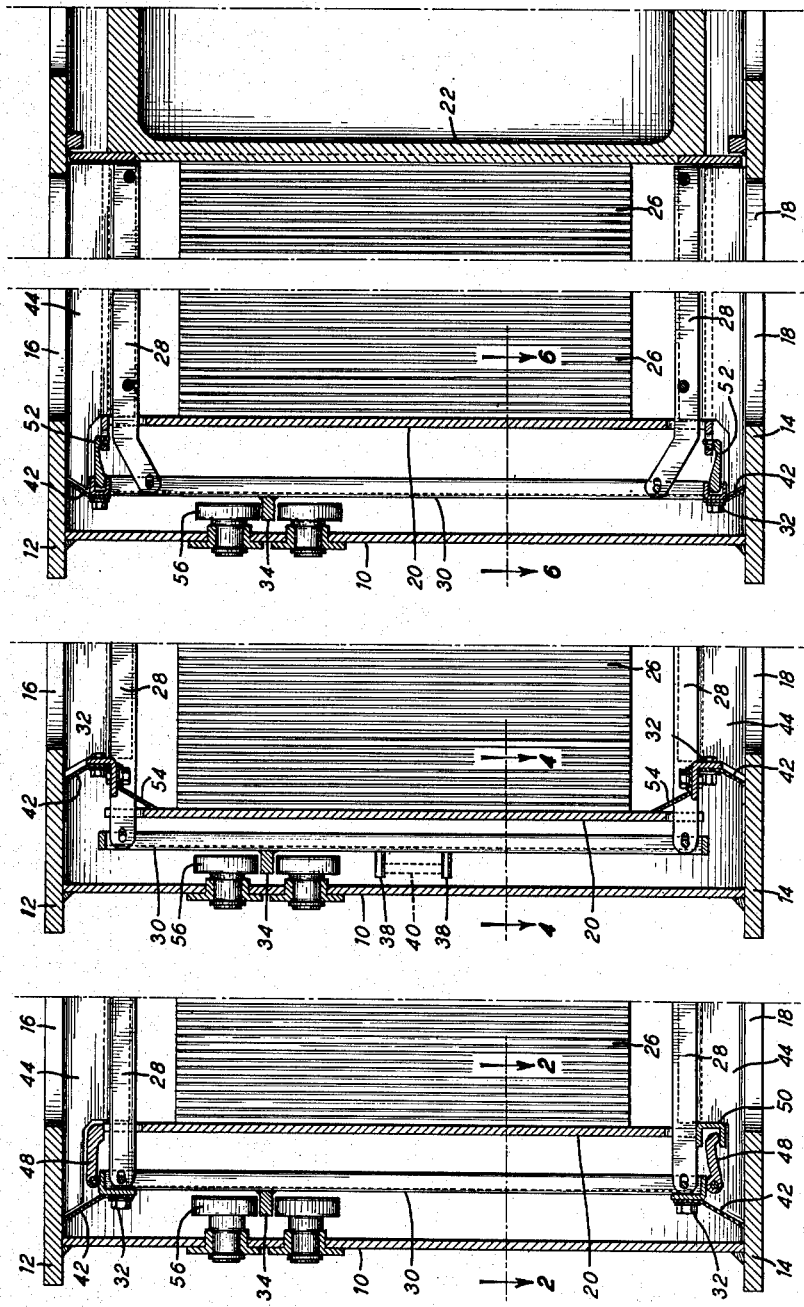

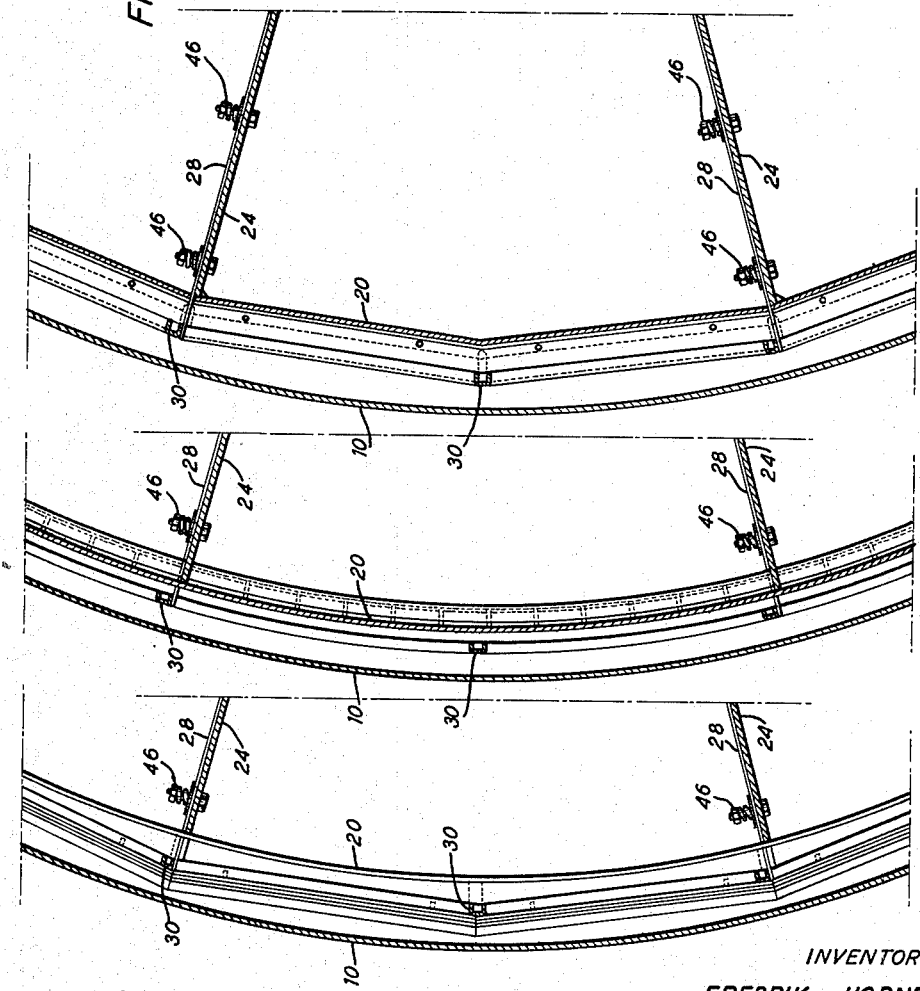

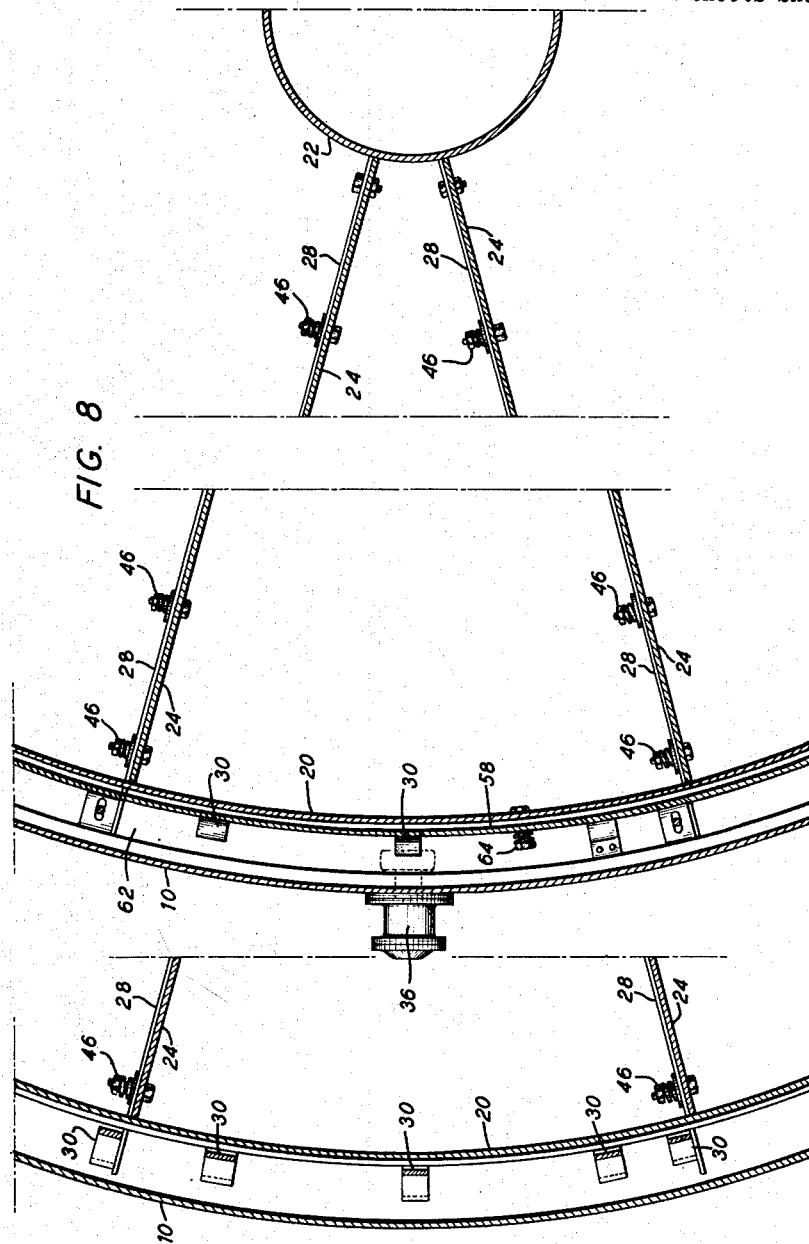

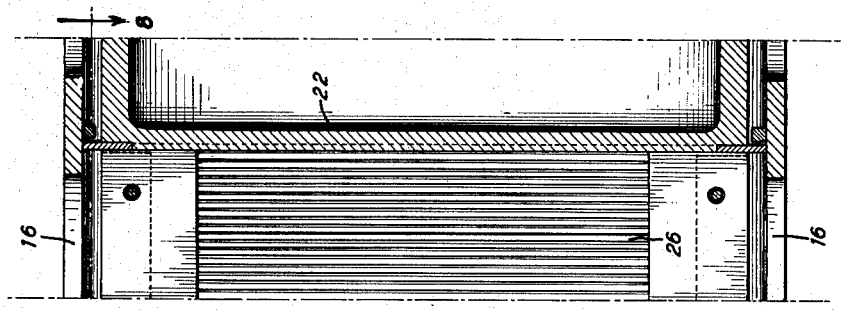
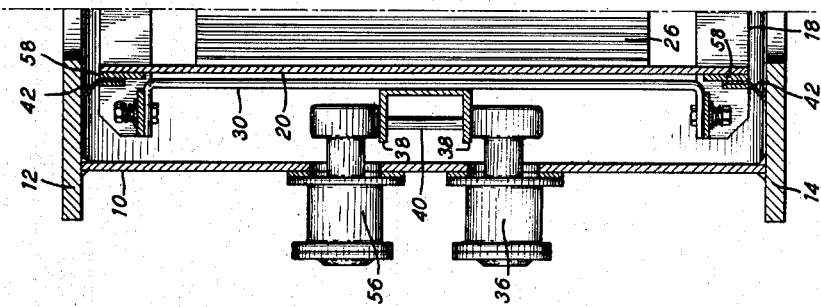
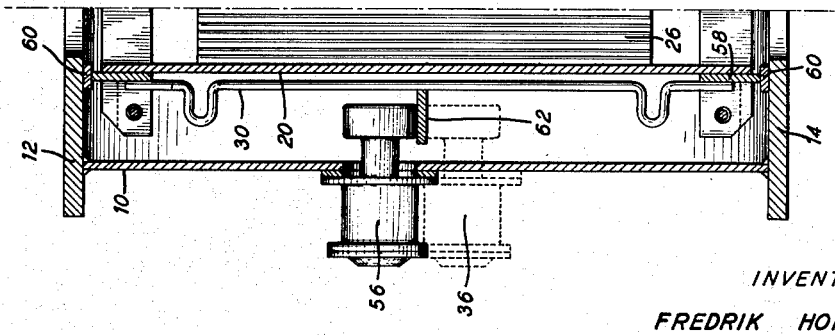

2,678,194

UNITED STATES PATENT OFFICE 2,678,194

SEALING DEVICE FOR ROTARY HEAT EXCHANGERS

Fredrik Horney, Bromma, Stockholm, and Walther Per Sigvard Persson, Enskede, Sweden, assignors, by mesne assignments, to Jarvis C. Marble, New York, N. Y., Leslie M. Merrill, Westfield, N. J., and Percy H. Batten, Racine, Wis., as trustees Application December 27, 1950, Serial No. 202,888

Claims priority, application Sweden January 4, 1950

7 Claims. (Cl. 257—6)

The present invention relates to sealing devices for rotary heat exchangers and has particular reference to regenerative air preheaters consisting of a rotor which is rotatably mounted in a cylindrical housing. The rotor is divided into a plurality of sectional compartments containing heat transfer elements which alternately absorb heat from hot gases and emit heat to cold air passing through the preheater in counter-flow. The cylindrical housing is provided with end plates in which there are sector shaped apertures for air and gas respectively. In order to prevent the gas or the air from passing the rotor without passing through the elements of the rotor, seals are arranged along the circumference of the rotor sealing against the cylindrical housing. Likewise, sealing devices are arranged on the partition walls between the compartments of the rotor, which sealings are intended to prevent a leakage between the air and gas side. Several proposals concerning peripheral as well as radial sealing arrangements have been made. Among others may be mentioned rigid mounted, thin and flexible strips, tiltable sealing elements, displaceable sealing shoes, etc. These sealing devices, however, have the disadvantage of not enabling the required sealing effect to be accomplished due to the warping of the rotor, which is dependent on the influence of the hot gases on the rotor, or the disadvantage of too great a wearing of the sealing elements.

The purpose of the present invention is primarily to overcome these deficiencies and to provide sealing devices which practically maintain a constant clearance between the stationary casing of the preheater and its rotor even if warpings of the latter occurs when the preheater is in operation.

This has been effected substantially by supporting the peripheral as well as the radial sealing devices of the preheater by devices independent of the warping of the rotor of the heat exchanger.

A suitable arrangement to support these sealing devices consists of radially disposed rod elements articulately mounted to the rotor hub at both ends of the hub which rod elements support flexible elements sealing against the end plates of the heat exchanger, these flexible elements preferably being made of thin plate strips, said rod elements at their outer ends being connected with rods or the like which are parallel to the rotor axis, which rods in turn are mutually connected with one another at their two ends by means of annular elements supporting the peripheral seals of preferably thin plate strips, whereby the rods which are parallel to the rotor axis are connected with one or more annular elements supported by rollers or similar elements, arranged on the cylindrical shell of the heat exchanger which rollers at the same time may be provided to be utilized as driving members for turning the rotor.

In order to prevent leakage of gas or air between the rotor shell and the annular elements supporting the peripheral seals there are journalled, on these and on the rotor shell respectively, turnable annular plates placed one after the other which plates are arranged to be in contact with the rotor shell and the annular elements respectively.

The radially arranged rod elements may at their outer ends be alternately connected with annular elements arranged at the inside of the rotor shell and supporting the peripheral seals, said annular elements being provided with devices sealing against the inside of the rotor shell.

The radially arranged rod elements are preferably at their ends facing the rotor articulately mounted to the radial partition walls connecting the hub of the rotor with its shell. Against said partition walls the rods may be pressed by means of springloaded bolts arranged in slitshaped openings in the partitions allowing for warping of the rotor without change of the position of these elements relative to the rotor axis.

The invention will be more fully described in connection with the following description of some embodiments of the sealing device according to the invention, said embodiments being illustrated by way of example on the accompanying drawings, in which:

Fig. 1 is a sectional view of part of an embodiment of the sealing device according to the invention.

Fig. 2 is a section taken on the line II—II of Fig. 1.

Fig. 3 is a sectional view of another embodiment of the sealing device.

Fig. 4 is a section taken on the line IV—IV of Fig. 3.

Fig. 5 is a sectional view of another embodiment of the invention.

Fig. 6 is a section taken on the line VI—VI of Fig. 5.

Fig. 7 is a sectional view of still a further embodiment of the invention.

Fig. 8 is a section on the line VIII—VIII of Fig. 7.

Fig. 9 is a section on the line IX—IX of Fig. 7.

Figs. 10 and 11 are two modifications of the sealing device illustrated in Fig. 7, shown in section.

In the embodiment of the sealing device shown in Figs. 1 and 2 of the accompanying drawings, the cylindrical shell of the preheater is denoted at 10, and provided with two end plates 12 and 14, in which sector shaped openings 16 and 18 are provided for the passage of the gas and the air, respectively, through the preheater. The cylindrical shell 20 of the rotor is connected with the rotor hub 22 by means of radially arranged partition walls 24 forming compartments within the rotor in which compartments are placed heat transfer elements 26 consisting of separated plates of different shape or other heat absorbing or heat emitting elements. At the ends of these partition walls facing towards the hub 22 there are articulately mounted rods 28 which rods extend along the partition walls, said rods being of rectangular or other convenient cross-section. These rods at their outer ends are articulately connected with cross bars or stays 30 arranged parallel to the rotor shell 20 and interconnected by means of rings 32 made of angle irons, U-irons or flat irons and welded or riveted at their ends.

Furthermore the cross-stays are interconnected by means of ring shaped flat irons 34 supported by three or four rollers 36 journalled in the shell 10 of the preheater, one of which rollers may be connected with a driving member for turning the rotor of the preheater. These cross-stays 30 may furthermore be connected with ring formed flat irons 38, which as denoted with dotted lines are provided with pins 40 arranged parallel to the cross-stays which pins are intended to mesh with the teeth of a gear wheel connected with a driving member for turning the rotor. On the rings 32 made of angle iron, U-irons or flat irons there are arranged thin sealing strips 42 intended to be kept with smallest clearance between their free edges and the end plates 12, 14 of the preheater to form peripheral seals. On the radial rods 28 are likewise attached thin sheets 44 forming sealing devices which upon rotation of the rotor provide the radial seals between the air and the gas side of the preheater. The radial rods 28 with their ends facing towards the hub 22 are articulately mounted to the partition walls 24, said rods 28 being pressed against these walls by means of spring actuated bolts 46 whereby slit shaped openings are provided in the partition walls for these bolts allowing the rotor to warp without effecting the rods 28 to be bent. In the embodiment shown in Figs. 1 and 2 in order to prevent leakage between the rotor shell 20 and the rings 32 supporting the peripheral seals 42, plates 48 are articulated to these rings, whereby the underlying plates 48 with their free ends protrude into the rings 50 of the rotor shell 20, the rings 50 being of U-shaped cross-sectional configuration.

According to the embodiment of Figs. 5 and 6 similar plates 52 are articulately mounted to the rotor shell 20 by means of pins and arranged with their long sides against the rings 32.

By means of these plates being preferably provided with overlapping plates at their two short sides, air and gas, respectively, are practically prevented from passing over the rotor of the heat exchanger.

According to the embodiment of Figs. 3 and 4 the ring shaped elements 32 supporting the peripheral seals 42 are directly fastened to the radially arranged rods 28 within the rotor shell 20. In order to prevent leakage between the rotor shell 20 and the ring shaped elements 32 these are provided with sealing strips 54 placed against the inner side of the rotor shell. At 56 is denoted guide rollers serving to limit the upward movement of the cross-stays.

The embodiment shown in Figs. 7 and 8 differs from the above described embodiments of the sealing device according to the invention substantially therein that on the outer side face of the rotor shell are placed several adjacent bow formed plates or arc-shaped members 58 being axially slidable along the rotor shell 20 and at their opposite ends provided with flange formed elements 60 serving as sealing devices. These bow shaped plates are by means of spring actuated bolts 64 or the like pressed to the outer side face of the rotor shell 20. The rods 28 articulately mounted on the partition walls 24 at the hub 22 at their outer ends are fixed to flexible cross-stays 30. These cross-stays are interconnected by means of a ring 62 supported by rollers 36 being journalled in the cylindrical shell 10 of the preheater.

The embodiment of Fig. 10 differs from the one shown in Fig. 7 only that the carrier ring 62 is displaced downwardly to about half of the cross-stays 30 while the embodiment according to Fig. 11 differs from the one shown in Fig. 7 substantially in that the bow formed plates 58 are provided with sealing strips 42 instead of the flange formed parts 60. This embodiment furthermore shows a manner of driving the rotor of the preheater by means of a gear wheel journalled in the shell of the preheater, which gear meshes with pins 40 fixed to the rotor shell.

The invention, not being limited to the illustrated and described embodiments, may evidently be varied in several ways within the scope of the appended claims.

What is claimed is:

1. A regenerative heat exchanger comprising a fixed housing structure, including two end plates provided with sector shaped inlet and outlet openings for passing of gas and air, respectively, a rotatable rotor in said housing consisting of a hub and a shell connected by means of radial partition walls forming compartments for a heat exchanging mass, sealing means provided between said housing and said shell of the rotor and between said partition walls of the rotor and said end plates of the housing, members movable relative to said rotor for carrying said sealing means, and supporting means on said rotor and on said housing for carrying said members in fixed predetermined spaced relationship relative to said end plates in planes passing through the axis of the rotor.

2. In a regenerative heat exchanger as defined in claim 1, a sealing device comprising radial bar shaped members provided at both sides of said rotor and articulately mounted adjacent to said hub of the rotor and at their outer ends articulately interconnected by means of rod members parallel with the rotor axis, said rod members being at their end portions connected with rings carrying yielding sealing means between said housing and said shell of the rotor and further connected with an intermediate ring carried by means of rollers journalled in the shell of said housing.

3. In a regenerative heat exchanger provided with a sealing device as claimed in claim 2, the provision of plate shaped members swingably mounted on said rings carrying said sealing means and in close proximity to each other forming substantially continuous ring shaped members between said rings carrying said yielding sealing means and said shell of the rotor, the inner portions of said plate shaped members being supported by the end portions of the shell of the rotor.

4. In a regenerative heat exchanger provided with a sealing device as claimed in claim 2, the provision of plate shaped members swingably mounted on the end portions of said shell of the rotor and in close proximity to each other forming substantially continuous ring-shaped members between said shell of the rotor and said rings carrying said yielding sealing means, the outer portions of said plate shaped members being supported by the ring carrying said sealing means.

5. In a regenerative heat exchanger as defined in claim 1, a sealing device comprising radial bar-shaped members provided at both sides of said rotor and articulately mounted adjacent to the center of same and at their outer end portions interconnected by means of ring shaped members carrying yielding sealing means between said members and the housing of the heat exchanger, said ring shaped members being provided with sealing means between the inner side of said shell of the rotor and said ring shaped members, said radial bar shaped members on one side of the rotor being articulately interconnected with said radial bar shaped members on the other side of the rotor by means of rods parallel to the axis of the rotor, said rods being interconnected by means of at least one ring supported by rollers journalled in the shell of said housing.

6. In a regenerative heat exchanger as defined in claim 1, sealing members comprising radial bar shaped members provided at both sides of the rotor of the heat exchanger and articulately mounted adjacent to the center of said rotor and at their outer ends interconnected by means of stays parallel to the rotor axis, said stays being interconnected with at least one ring shaped member carried by rollers journalled in the shell of the housing of the heat exchanger, arc-shaped members yieldably and slidably held against the outer surface of the rotor shell, and a flange on the outer edge of each arc-shaped member engaging the inner surface of the adjacent end plate of the heat exchanger and forming sealing means therewith.

7. In a regenerative heat exchanger as defined in claim 1, a sealing means comprising radial bar shaped members provided at both sides of said rotor and articulately mounted adjacent to the center of the rotor and at their outer ends articulately interconnected by means of rod members parallel with the rotor axis, said bar shaped members carrying yielding sealing means sealing against the end plates of said housing, said bar shaped members being held close to said partition walls by means of biasing means permitting relative substantially axial movement between said bar shaped members and said partition walls.

References Cited in the file of this patent

UNITED STATES PATENTS

| Number | Name | Date |
|---|---|---|
| 2,055,071 | Eriksson | Sept. 22, 1936 |
| 2,287,777 | Boestad | June 30, 1942 |
| 2,471,995 | Yerrick et al. | May 31, 1949 |

FOREIGN PATENTS

| Number | Country | Date |
|---|---|---|
| 500,682 | Great Britain | Feb. 14, 1939 |